United States Patent
Sese

[15] 3,658,473
[45] Apr. 25, 1972

[54] METHOD FOR THE MANUFACTURE OF MAGNESIUM HYDROXIDE

[72] Inventor: Kiyoaki Sese, Tokyo, Japan
[73] Assignee: Asahi Glass Co., Ltd., Tokyo, Japan
[22] Filed: Jan. 23, 1970
[21] Appl. No.: 5,348

[30] Foreign Application Priority Data
June 15, 1966 Japan..................................41/38201

[52] U.S. Cl....................................23/201, 23/273, 23/304
[51] Int. Cl..........................................C01f 5/14, B01d 9/02
[58] Field of Search...................................23/201, 304, 273

[56] References Cited

UNITED STATES PATENTS 2,405,055  7/1946  Robinson et al..........................23/201
3,275,410  9/1966  Leatham et al..........................23/201

Primary Examiner—Oscar R. Vertiz
Assistant Examiner—G. Alvaro
Attorney—Bailey, Stephens & Huettig

[57] ABSTRACT

Magnesium salt-containing solution, calcium hydroxide, and 4 to 20 gms. calculated in the form of MgO of magnesium hydroxide seed, per liter of said magnesium salt-containing solution, are introduced into a reactor equipped with an internal recirculation tube and the concentration of magnesium ion contained in the magnesium salt-containing solution is diluted 10 to 70- fold with a mother liquor of magnesium hydroxide and said magnesium salt-containing solution and calcium hydroxide are put into reaction.

2 Claims, 3 Drawing Figures

Patented April 25, 1972

3,658,473

INVENTOR.
KIYOAKI SESE
BY
Bailey, Stephens & Huettig
ATTORNEYS

3,658,473

METHOD FOR THE MANUFACTURE OF MAGNESIUM HYDROXIDE

This application is a continuation of my earlier co-pending application Ser. No. 644,956, filed June 9, 1967, and now abandoned.

BACKGROUND OF THE INVENTION

1. Field of the Invention.

This invention relates to a method for the manufacture of magnesium hydroxide.

Particularly, precipitation of magnesium hydroxide having a rapid sedimentation rate is effected from a magnesium salt-containing solution such as sea water.

2. Description of the Prior Art.

Magnesium hydroxide manufactured by reaction of an aqueous solution of soluble magnesium salts such as bittern or sea water with milk of lime has a very low sedimentation rate and its filtration is difficult.

Consequently, in order to improve the sedimentation characteristics and filtration characteristics, much effort has hitherto been paid by numbers of industrialists and numerous propositions have been tried.

For instance, there is a known method wherein sea water and milk of lime or sea water and burned dolomite are caused to react with each other under forced circulation outside a reactor or reaction vessel, and a further method wherein sea water and milk of lime or sea water and burned dolomite are put into reaction in the presence of added magnesium hydroxide. These methods are typical.

However, it is still impossible according to these methods to produce immediately magnesium hydroxide having a fully satisfactory sedimentation rate and capable of increasing the slurry concentration in a short interval of time. For this reason, in fact, in order to manufacture magnesium hydroxide on an industrial scale, it has been necessary to increase gradually the slurry concentration of magnesium hydroxide obtained from a reaction vessel or reactor over a long period of time by slowly sedimenting the magnesium hydroxide in shifting from thickener to thickener using large thickeners. Accordingly, in conventional known methods of manufacturing apparatus for magnesium hydroxide, substantial parts are occupied by thickeners, and as a result, the initial cost and plant area costs have been remarkably high. Moreover, magnesium hydroxide thus manufactured has a high water content and the sedimented particles are relatively minute and difficult to filter and in addition, a large amount of heat value is required to dry the filter cake. Thus, the manufacturing cost is high.

In short, in conventional known methods it has not been expected to increase the sedimentation rate of magnesium hydroxide substantially and to make the concentration of slurry effectively great in a short interval of time.

BRIEF SUMMARY OF THE INVENTION

An object of the present invention is to provide a manufacturing method for magnesium hydroxide of rapid sedimentation rate and increasing its slurry concentration in a short interval of time.

Another object of the present invention is to provide a manufacturing method of such magnesium hydroxide which is capable of being filtered easily and, in addition, forms a filter cake of low water content.

These objects and other objects can be accomplished by the following novel method which comprises:

introducing a magnesium salt-containing solution and calcium hydroxide, together with 4 to 20 gms. calculated in the form of MgO of magnesium hydroxide seed per liter of magnesium salt-containing solution into a reactor or reaction vessel; and reacting the magnesium salt-containing solution with calcium hydroxide after diluting these materials 10 to 70- fold ( or times ) with a mother liquor of magnesium hydroxide previously obtained.

BRIEF DESCRIPTION OF THE DRAWINGS

In the accompanying drawings.

" Dilution rate " means a rate at which the concentration of magnesium ion contained in supplied magnesium salt-containing solution is diluted by the mother liquor of magnesium hydroxide.

Figure 3:
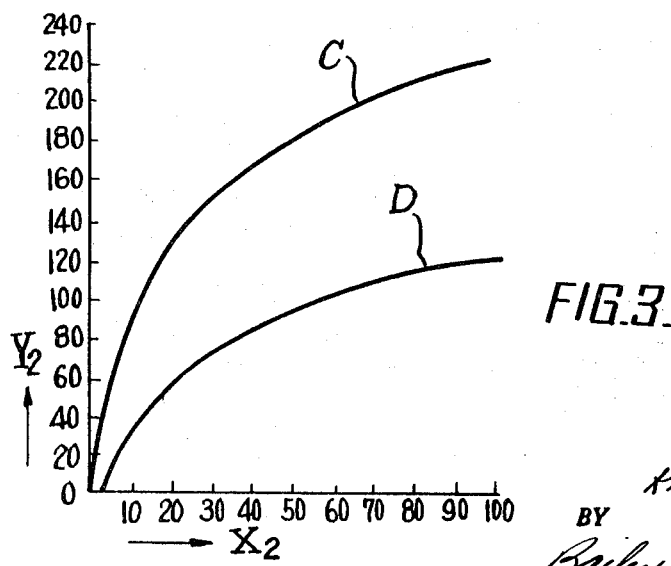

FIG. 3 is a graph showing a relation between the clarification time and slurry concentration of magnesium hydroxide manufactured by one embodiment of the method of the present invention, in comparison with that in conventional known methods, wherein slurry concentration $Y_2$ ( gram per liter ) of magnesium hydroxide, calculated in the form of MgO is shown as an ordinate, while the clarification time $X_2$ ( hour ) of magnesium hydroxide slurry is shown as an abscissa respectively.

DETAILED DESCRIPTION INCLUDING PREFERRED EMBODIMENTS

According to the present invention, magnesium salt-containing solution, calcium hydroxide and 4 to 20 gms. calculated in the form of MgO of magnesium hydroxide seed per liter of magnesium salt-containing solution are respectively introduced into a reactor wherein an internal recirculating tube is equipped and then the magnesium salt-containing solution and the calcium hydroxide are put into reaction with the concentration of magnesium ion contained in the magnesium salt-containing solution, such as sea water, being diluted 10 to 70-fold in the internal recirculating tube with a mother liquor of magnesium hydroxide, thereby such a filter cake can be obtained that consists of large sedimented particles, and has high slurry concentration and high sedimentation rate and easy filtration and low water content.

In the present invention " magnesium hydroxide mother liquor " used herein means the following type of solution. Namely, magnesium ion dissolved in a magnesium salt-containing solution, for instance, sea water is converted into magnesium hydroxide by reaction with calcium hydroxide. This reduces the concentration of magnesium ion. In this way, the concentration of magnesium ion contained in the magnesium salt-containing solution becomes gradually decreased and thus, magnesium ion is decreased to some extent or removed by precipitation. The magnesium salt-containing solution in this state is called " mother liquor ".

In the present invention, both the above-mentioned dilution rate and the addition of seed make it possible to produce magnesium hydroxide of high sedimentation rate, and high slurry concentration advantageously on an industrial scale. Accordingly, the dilution rate below the predetermined value makes it impossible to obtain magnesium hydroxide of sufficient sedimentation rate and rapid slurry concentration, irrespective of the quantity of seed to be added. On the contrary, the dilution rate above the predetermined value or the addition of seed below the predetermined amount can not also yield magnesium hydroxide of sufficient sedimentation rate and slurry concentration. The dilution rate above the predetermined value and the addition of seed above the predetermined amount lower the sedimentation rate and requires more work for concentration.

In consequence, in the present invention, it is necessary to set the dilution rate at 10 to 70- fold and the amount of magnesium hydroxide seed to be added at 4 to 20 gms. calculated as MgO per liter of magnesium salt-containing solution to be supplied.

However, in particular, when the dilution rate is set at 30 to 50-fold and the quantity of magnesium hydroxide seed to be added is preferably 6 to 10 gms. calculated MgO, magnesium hydroxide slurry of especially high sedimentation velocity and high concentration can be obtained, which is readily further processed and economically produced.

On the other hand, it has also been found that the concentration of the added magnesium hydroxide seed is independent of the sedimentation rate and concentration of magnesium hydroxide slurry obtained from the reaction.

In the formation of magnesium hydroxide it is preferable to convert magnesium ion contained in the magnesium salt-containing solution effectively into magnesium hydroxide, and moreover, to avoid contamination with unreacted calcium hydroxide. For this reason, in the present invention, it is preferred to perform the formation of magnesium hydroxide in a range from pH 9.8 to pH 10.2. Alkalinity higher than pH 10.2 reduces remarkably the sedimentation rate of magnesium hydroxide.

Magnesium salt-containing solution to be used as a raw material includes sea water, bittern, subterranean brine and other magnesium salt-containing solutions.

Moreover, magnesium salt-containing solution is preferably decarbonated, if desired, in order to prevent magnesium hydroxide from contamination with calcium carbonate.

Another raw material, calcium hydroxide is used normally in the form of suspension or aqueous solution. For instance, such milk of lime is used that is obtained by the method wherein limestone or dolomite is calcined to quick lime and the quick lime is slaked, and calcium carbide residue can be used as an aqueous solution as it is, or after added with abundant water to eliminate aluminum or iron values.

Furthermore, in the present invention, when magnesium hydroxide is produced by reaction of magnesium salt-containing solution with calcium hydroxide, magnesium hydroxide newly produced forms around the seed of magnesium hydroxide slurry and thus, the particle size becomes gradually larger so that a product of magnesium hydroxide is obtained in relatively large size, and has a rapid sedimentation rate and a high slurry concentration.

In the following, the present invention will now be illustrated with reference to the accompanying drawings.

Figure 1:
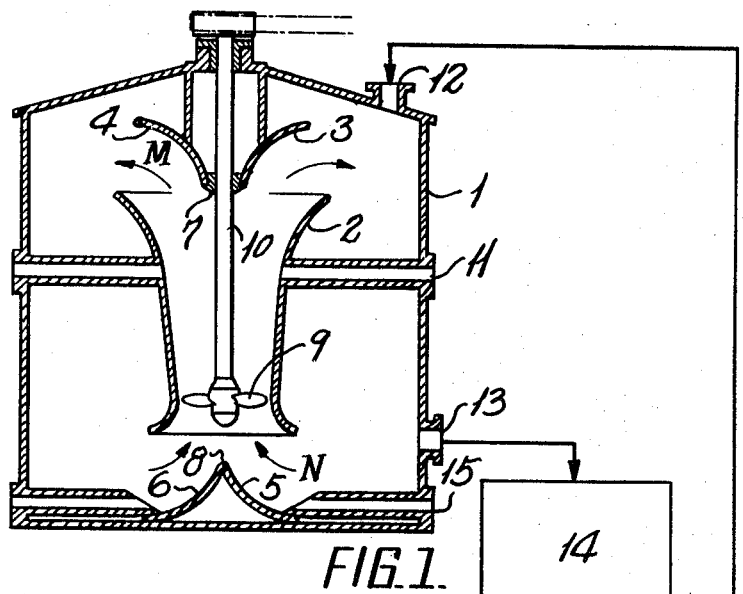
FIG. 1 is a schematic view of one embodiment of the apparatus used for carrying out the method of the present invention.

In FIG. 1, an internal recirculating tube 2 is disposed at substantially the middle part of cylindrical reaction vessel or reactor 1 and supported concentrically thereto. The internal recirculating tube 2 is of a shape of truncated cone having an outwardly divergent trumpet-shaped portion respectively at its upper and lower parts.

Further, the top angle of said conical shape varies depending on the concentration of magnesium ion contained in magnesium salt-containing solution used as a raw material or the concentration of calcium hydroxide contained in its suspension or aqueous solution of calcium hydroxide. In general, an angle of the order of from 5° to 25° is suitable. In particular, the internal recirculating tube having top angle of 10° to 20° can yield effectively an easily filtrable magnesium hydroxide having a high sedimentation rate. The height and diameter of top and bottom surfaces of the internal recirculating tube are determined depending on the dimension of the reactor, and normally, the height of the internal recirculating tube is preferably 35 to 50 percent of the height of the reactor and the diameter of the top end and bottom surfaces is preferably 40 to 60 percent of the diameter of the reactor. The manufacture of magnesium hydroxide in the reactor equipped with such an internal recirculating tube is especially advantageous in industry. However, even when the shape of internal recirculating tube is in the shape such as cylinder having top and bottom surfaces of the same diameter, magnesium hydroxide can be produced satisfactorily.

An impeller 9 is provided on a shaft 10 at substantially the middle part of the internal recirculating tube 2, and said impeller is rotated by an appropriate driving apparatus, such as a motor and the like provided outside of the reactor. By the revolution of the impeller, raw materials and magnesium hydroxide mother liquor are forcedly circulated in the reactor, and magnesium ion concentration of the magnesium salt-containing solution is diluted with the magnesium hydroxide mother liquor to the predetermined proportion.

At the top and bottom of reactor 1, a cone body M having concavely curved surfaces 3 and 4, and a cone body N having concavely curved surfaces 5 and 6 are respectively disposed coaxially to the reactor with the apex 7 of said cone body M and the apex 8 of said cone body N being opposed each other.

These cone bodies M and N respectively having concave surfaces 3, 4 and 5, 6 contribute to the circulation when the raw materials are forcedly circulated with the mother liquor of magnesium hydroxide in the reactor and prevent turbulance of the circulating flow and serve to effect the reaction sufficiently uniform.

The positions 15 and 11 of the reactor 1 through which the suspension or aqueous solution of calcium hydroxide and magnesium salt-containing solution are fed respectively are variable. The object of the present invention can sufficiently and satisfactorily be accomplished particularly when calcium hydroxide is fed from the bottom of the reactor and magnesium salt-containing solution is supplied from the middle part of the reactor wall into the internal recirculating tube. The reference numeral 12 indicates an inlet portion through which a magnesium hydroxide slurry produced is fed into the reactor as a seed.

Furthermore, the raw materials introduced continuously into the reaction vessel by a predetermined amount are circulated together with the magnesium hydroxide mother liquor in the directions shown by the arrows in the reactor by the revolution of the impeller 9 provided at substantially the middle part of the internal recirculating tube 2 to produce magnesium hydroxide. The resulting magnesium hydroxide is continuously withdrawn from an outlet hole 13 in the state of a slurry, and transferred to a thickener 14, wherein magnesium hydroxide is caused to settle. Thereafter, the settled magnesium hydroxide is taken out from a discharging hole 16, a part of which is again fed into the reactor as a seed from the inlet portion 12 by a pump P, the greater part of which is further transmitted to a filtering machine in order to manufacture magnesium hydroxide product.

This invention is further concretely described in the following examples, which are illustrative and but not limitative thereof, with reference to the reactor shown in FIG. 1 of the accompanying drawing.

Furthermore, the sedimentation rate given in the present examples has been determined in the following method. Namely, magnesium hydroxide slurry produced was filled in a glass tube having 0.4 cm diameter and 70 cm length. The height ($h$) of the supernatant liquid after 10 minutes has been measured, and the estimated value per 1 hour has been adopted as a sedimentation rate.

EXAMPLE 1

Sea water containing magnesium salt of 2 gms/liter calculated in the form of MgO was mixed with milk of lime adjusted to pH 9.2 to 9.3 by well-known means to eliminate carbonate radical contained in the sea water as a calcium carbonate. The sea water thus decarbonated was supplied to the reactor 1 at a rate of 500 m³/hr from sea water-feeding tube 11 having a diameter of 25 cm. provided on the reactor; and 50 gms/liter concentration of milk of lime prepared by an appropriate well-known means was also supplied thereto at a rate of 26.6 m³/hr from a milk of lime-feeding tube 15 of 25 cm. diameter provided at the lower part of the reactor 1, and magnesium hydroxide slurry previously obtained (concentration of 15 percent, calculated in the form of MgO) was likewise fed into the reactor continuously as seed from a seed-inlet portion 12 provided at the upper wall of the reactor at a rate of 8 gms. calculated in the form of MgO per liter of sea water. These materials were subjected to reaction in the reactor under forced circulation of the dilution rate of 40.

The resulting magnesium hydroxide slurry was taken out from the outlet hole 13 continuously in accordance with the quantity of raw materials fed.

The magnesium hydroxide slurry thus obtained had a sedimentation rate of 4.6 m/hr, and could be filtered easily with Oliver filter. Thus obtained filter cake of magnesium hydroxide contained 34 % MgO.

In order to compare the present invention with hitherto known methods, magnesium hydroxide was manufactured with the exception of the condition for the addition of seed from the various conditions for the manufacture of magnesium hydroxide used in the above Example 1. Magnesium hydroxide obtained has the sedimentation rate of 4 m/hr, and the filter cake contained 29 % MgO.

EXAMPLE 2

Decarbonated sea water as referred to in Example 1 was fed at a rate of 500 m$^3$/hr, milk of lime having 50 gms/liter concentration of calcium, calculated in the form of CaO was fed at a velocity of 26.6 m$^3$/hr, and magnesium hydroxide slurry ( 15 percent concentration, calculated in the form of MgO ) previously obtained as a seed was fed at a rate of 10 gms, calculated in the form of MgO, per liter of sea water. These were respectively fed into the reactor continuously.

These materials were then reacted with each other in the reactor under forced circulation at a dilution rate of 0 to 70.

Figure 2:
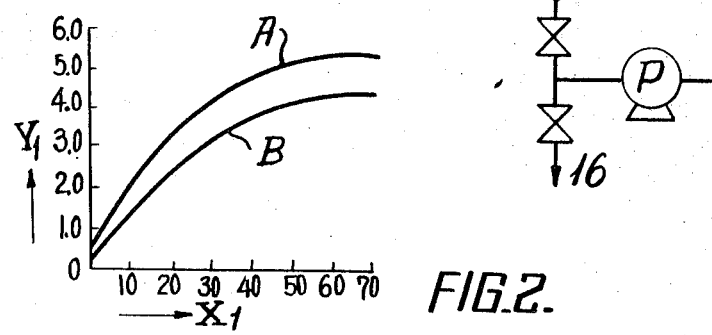
FIG. 2 is a graph showing the relation between the dilution rate and sedimentation rate at the time when magnesium hydroxide is manufactured by the method of the present invention, as compared with that in conventional known methods, and wherein the sedimentation rate $Y_1$ ( meter per hour ) of magnesium hydroxide is shown as an ordinate, and as an abscissa is shown the dilution rate $X_1$ respectively.

On the other hand, in order to compare the present invention with conventional known methods, magnesium hydroxide was manufactured with the exception of the condition for the addition of seed from the various conditions used in the above-described Example for producing magnesium hydroxide. These results were as shown in FIGS. 2 and 3. In FIG. 2, the dilution rate was shown as an abscissa and the sedimentation rate shown as an ordinate respectively. In FIG. 2, A represents a curve for the magnesium hydroxide produced by the method of the present invention and B represents a curve for the magnesium hydroxide produced by conventional known methods.

In FIG. 3, the abscissa indicates clarification time for slurry produced, and the ordinate represents the concentration of slurry produced respectively. C represents a curve for magnesium hydroxide produced by the method of the present invention, while D represents a curve for magnesium hydroxide produced by conventional known method.

By FIGS. 2 and 3, the following matters can be understood.

The sedimentation rate of magnesium hydroxide produced by the method of the present invention is greater than that produced by conventional known method. Moreover, the magnesium hydroxide produced by the method of the present invention increases the slurry concentration in an short interval of time in comparison with that of conventional known methods.

What is claimed is:

1. A method of manufacturing magnesium hydroxide which comprises: providing a cylindrical reactor having a cylindrical internal recirculating tube located centrally of the reactor and having an outwardly divergent trumpet-shaped portion at its upper and lower parts, the trumpet shaped portion at the upper part of the tube flaring at an angle of from 5° to 25°, said reactor having upper and lower cone shaped members having concave surfaces and being disposed coaxially of the tube adjacent the upper and lower parts thereof with the apexes of said members being disposed towards one another said cone shaped members assisting circulation through the reactor by preventing turbulence of the circulating flow and assisting to make the reaction uniform; introducing decarbonated sea water into the internal tube of said reactor; introducing an aqueous calcium hydroxide stream into said reactor; introducing an aqueous slurry of magnesium hydroxide seed into said reactor in an amount of 6 to 10 grams per liter of sea water introduced into the reactor; circulating the liquid introduced into the reactor in a path through the internal circulating tube and out into the cylindrical reactor, through the cylindrical reactor, and back into the internal circulating tube, the rate of circulation being such that from 30 to 50 volumes of circulating liquid are circulated into the internal tube for each unit volume of sea water introduced thereto; and removing an aqueous slurry of magnesium hydroxide from said reactor having a sedimentation rate of at least about 4.0.

2. A method according to claim 1 wherein: sea water contains magnesium salt in an amount of about 2 grams per liter as MgO.

* * * * *